(12) United States Patent
Martin et al.

(10) Patent No.: US 6,356,248 B1
(45) Date of Patent: Mar. 12, 2002

(54) SPACERS FOR USE IN AN ELECTRO-OPTICAL ADDRESSING STRUCTURE

(75) Inventors: Paul C. Martin, Vancouver, WA (US); Daryl L. Nishida, Aloha, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 08/304,973

(22) Filed: Sep. 12, 1994

Related U.S. Application Data

(63) Continuation of application No. 08/026,394, filed on Mar. 4, 1993, now abandoned.

(51) Int. Cl.[7] .................................................. G09G 3/28
(52) U.S. Cl. ........................................... 345/60; 345/87
(58) Field of Search ............................. 345/55, 60, 87, 345/37, 38, 71; 359/81; 313/582; 315/169.1, 169.4

(56) References Cited

U.S. PATENT DOCUMENTS

| | | | |
|---|---|---|---|
| 3,615,461 A | * 10/1971 | Kaplan | 96/36.1 |
| 3,771,855 A | 11/1973 | Burns | 350/160 |
| 3,806,230 A | * 4/1974 | Haas | 350/160 LC |
| 3,821,748 A | 6/1974 | Brown | 346/74 P |
| 3,863,332 A | 2/1975 | Leupp et al. | 29/580 |
| 3,904,915 A | 9/1975 | Hinson | 313/484 |
| 3,909,930 A | 10/1975 | Gurtler | 29/592 |
| 3,994,567 A | 11/1976 | Matsuo et al. | 350/160 |
| 4,256,382 A | 3/1981 | Piliavin et al. | 350/334 |
| 4,295,712 A | 10/1981 | Ishiwatari | 350/344 |
| 4,352,101 A | 9/1982 | De Jule | 340/769 |
| 4,526,818 A | * 7/1985 | Hoshikawa et al. | 428/1 |
| 4,653,864 A | * 3/1987 | Baron et al. | 350/344 |
| 4,763,995 A | * 8/1988 | Katagiri et al. | 350/344 |
| 4,896,149 A | 1/1990 | Buzak et al. | 340/794 |
| 5,036,317 A | 7/1991 | Buzak | 340/783 |
| 5,177,629 A | * 1/1993 | Bohannon | 359/81 |

FOREIGN PATENT DOCUMENTS

| | | | |
|---|---|---|---|
| GB | 1336254 | 3/1971 | |
| JP | 59222817 | * 12/1984 | 359/81 |
| JP | 6174239 | * 4/1986 | 345/60 |
| JP | 0025068 | * 5/1989 | |
| JP | 1550155 | 3/1990 | |
| JP | 4301621 | * 10/1992 | 359/81 |

OTHER PUBLICATIONS

Thomas Buzak, "Switching pixels with gas", Information Display, 10/90, vol. 6, No. 10, pp. 7–9, 14.*
Scheffer, Terry J., "Direct–Multiplexed Liquid Crystal Displays," Seminar 4, SID 1987, pp. 4.2–4.34.

* cited by examiner

Primary Examiner—Chanh Nguyen
(74) Attorney, Agent, or Firm—John D. Winkelman; Michael O. Scheinberg (57) ABSTRACT

A flat panel liquid crystal display (10) has an addressing structure (12) that uses an ionizable gaseous medium captured within channels (2) in a first electrode structure (42). An electro-optical material (44) structure positioned between the first electrode structure and a second electrode structure (40) has thickness that is determined by spacers (104, 110, and 126) that are formed on second electrode structure at points directly opposite support structures (66) between the channels. Such spacers provide support for the second electrode structure and do not intrude into the active area (70) of the display. The spacers are preferably formed of a polyimide resin layer using a photoetch process. Particulate spacers (110) can also be entrained in a black surround material (110) before it is applied to achieve spacers confined to inactive regions. Alternately, spacers (126) can be formed of the black surround material using a two-step photoetching process.

10 Claims, 12 Drawing Sheets

SPACERS FOR USE IN AN ELECTRO-OPTICAL ADDRESSING STRUCTURE

This is a continuation of applicatin Ser. No. 08/026,394 filed Mar. 4, 1993, which is now abandoned.

TECHNICAL FIELD

The present invention pertains to electrode structures in systems constructed of data storage elements which employ an ionizable gas to address an array of such storage elements.

BACKGROUND OF THE INVENTION

U.S. Pat. No. 4,896,149, issued Jan. 23, 1990 ("'149 Patent") of Buzak et al. for "Addressing Structure Using Ionizable Gaseous Medium," which is assigned to the assignee of the present invention, discloses an addressing structure using an ionizable gaseous medium. Such an addressing structure may be used in a system constructed of data storage elements and addressing those data storage elements with the use of an ionizable gas. Examples of such systems are flat panel displays, video cameras, and memory systems.

The system disclosed in the '149 Patent has an electrode structure having rows of plasma channels, each of which is filled with an ionizable gas. Extending along the base of each of those channels are a row electrode and a reference electrode. The row electrode is electrically driven as a cathode, and the reference electrode is referenced to ground and acts as an anode when the row electrode is electrically driven as a cathode.

The walls between the channels define mesa-like supporting structures having sloping walls and flat tops, upon which rest a thin dielectric material that seals the channels. The channels are filled with an ionizable gaseous medium contained at a low pressure. To achieve a dense addressing structure, such as is required for a high resolution flat panel display, the optically inactive space between the channels is small compared to the width of the channels. The supporting structures, therefore, are thin and, consequently, fragile and easily damaged.

A second electrode structure is spaced apart from the layer of dielectric material. The space between the dielectric layer and the second electrode structure is filled with an electro-optical material, such as a nematic liquid crystal. The liquid crystal is contained at a pressure matching that of the gaseous medium within the channel to reduce pressure on the thin dielectric and thereby prevent it from deforming or breaking. Because small variations in thickness affect the optical properties of the liquid crystal, the size and uniformity of the spacing between the dielectric layer and the second electrode structure are critical when the addressing structure is used in a liquid crystal display.

Several methods have been developed for maintaining the spacing between electrodes of prior art liquid crystal panels. Such panels typically comprise a liquid crystal material sandwiched between two glass plates that are thick relative to the dielectric layer used in the addressing structure in the '149 Patent. The spacing between the glass plates is typically maintained by particulate spacers, typically in the form of fibers or beads made of black or clear glass or plastic. The particulate spacers are blown onto one of the glass plates and are, therefore, randomly located. The density of the spacers is sufficiently low that the spacers do not significantly detract from the displayed image, but sufficiently high to provide adequate support for the second plate.

Spacing layers have also been applied as a coating and then photoetched. Examples are described in U.S. Pat. No. 1,336,254 of Gunther for "Devices," which uses a photoresist layer as a spacer and sealer, and Japanese Pat. No. 1,550,155 of Lin-Hendel et al. for "improved Liquid Crystal Display Incorporating Photopatterned Spacers," which is assigned to the assignee of the present invention and which uses photopatterned polyimide spacers in a conventional liquid crystal panel. These methods have been generally abandoned in favor of particulate spacers, which are easier to use and produce more repeatable spacings.

In prior art liquid crystal panels, the liquid crystal layer is typically positioned between two glass plates having electrodes on their inner surfaces. In the addressing system described in the '149 Patent, the liquid crystal layer is positioned between the thin dielectric layer and the second electrode structure. Voltage applied across a display element is stored partly across the liquid crystal layer and partly across the thin dielectric, but only the voltage stored across the liquid crystal layer affects its electro-optical properties. Reducing the thickness of the thin dielectric layer increases its capacitance, thereby reducing the fraction of the applied voltage that is stored across the dielectric layer and increasing the voltage stored across the liquid crystal. To reduce drive voltage requirements, the dielectric layer is made very thin, so that more of the applied voltage is stored across the liquid crystal. The thin dielectric is supported on the narrow top surfaces of the supporting structures separating the channels, resulting in an assembly that can be easily deformed or damaged.

The use of blown-in particulate spacers creates problems when used with the addressing structure of the '149 Patent. Because the dielectric layer is thin and unsupported between the channel walls, the dielectric tends to deform under a localized load, such as the load applied to the dielectric layer through the blown-in spacers. Because the liquid crystal is maintained at below one atmosphere of pressure, there is a net pressure on the second electrode structure, which tends to transfer the pressure through the spacers and onto the dielectric layer, deforming and possibly breaking it. Blowing in an adequate number of spacers to spread the force over a sufficiently wide area would intrude too many spacers into the display area and degrade the image.

SUMMARY OF THE INVENTION

An object of the present invention is, therefore, to provide for an electro-optical addressing system a method and an addressing structure that maintains a layer of an electro-optical material at a uniform, predetermined thickness.

Another object of this invention is to provide such an electrode structure and method that do not degrade a displayed image.

A further object of this invention is to provide such an electrode structure and method that do not deform or damage the dielectric sheet.

This invention relates to a method and apparatus for maintaining a layer of an electro-optical material, such as liquid crystal, at a uniform and accurate thickness in an addressing structure similar to the one described in the '149 Patent. The invention uses spacers that are formed in inactive areas of the display, particularly in areas that are directly above the top surfaces of the support structures of the first electrode structure. By so locating the spacers, the force transferred from the second electrode structure through the dielectric layer is transmitted directly onto the support structures. Therefore, the dielectric layer is less likely to deform or break. Furthermore, the number of spacers required is reduced compared to the number of random, blown-in spacers that would be needed because the spacers are positioned advantageously to support the second electrode structure.

Particulate contamination on the top surface of the support structures can hold the thin dielectric layer off of the support surface in places, forming a local tent-like structure. If a spacer were to press on the dielectric layer at such a structure, the dielectric layer may break or form defects. Minimizing the number of spacers used reduces the probability of a spacer pressing on a tent-like structure and thus reduces such breakage or defects.

A first preferred embodiment entails the use of photo-etched polyimide spacers positioned at intersections between first inactive areas defined by the top surfaces of the support structures and second inactive areas defined by the spaces between the column electrodes. The spacers are not needed at every intersection to provide sufficient support for the second electrode structure, and, therefore, spacers are used at fewer than all of the intersections to reduce contamination-induced breakage.

A second preferred embodiment entails the use of particulate spacers, such as glass fibers, entrained in a "black surround" material that is used to mask areas of uncontrolled optical properties in the display. When the black surround material is photoetched, spacers in active areas of the display are removed together with the black surround, while spacers in inactive areas remain held in place by the black surround.

A third preferred embodiment entails forming spacers from the black surround material. The black surround is patterned to create thick areas of black surround that function as spacers and thin areas of black surround that provide only the conventional masking function and allow the liquid crystal material to flow between display elements.

Additional objects and advantages of the present invention will be apparent from the detailed description of preferred embodiments thereof, which proceeds with reference to the accompanying drawings.

DETAILED DESCRIPTION OF PREFERRED EMBODIMENTS

The following discussion with reference to FIGS. 1–6 is taken from the '149 Patent to provide background for the description of the present invention. The figure numbers used in the following discussion are the same as those of the present disclosure.

Figure 1:
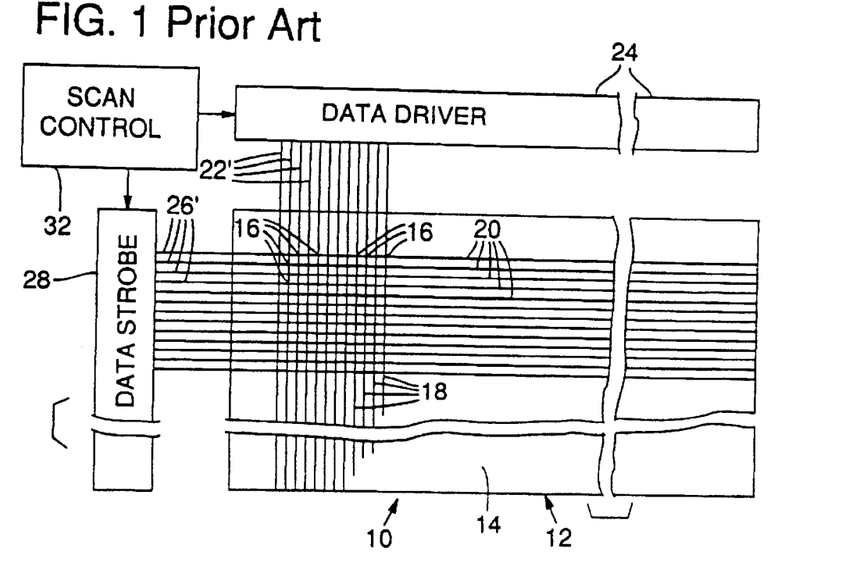
FIG. 1 is a diagram showing a frontal view of the display surface of a display panel and associated drive circuitry of a display system described in the '149 Patent.

FIG. 1 shows a flat panel display system 10, which represents a first embodiment that implements the addressing structure and carries out the addressing method of the '149 Patent. With reference to FIG. 1, flat panel display system 10 comprises a display panel 12 having a display surface 14 that contains a pattern formed by a rectangular planar array of nominally identical data storage or display elements 16 mutually spaced apart by predetermined distances in the vertical and horizontal directions. Each display element 16 in the array represents the overlapping portions of thin, narrow electrodes 18 arranged in vertical columns and elongate, narrow channels 20 arranged in horizontal rows. (The electrodes 18 are hereinafter referred to as "column electrodes 18.") Display elements 16 define active regions of display, i.e., regions in which the optical properties of the electro-optical material used in the addressing structure are controllable. Display elements 16 in each of the rows of channels 20 represent one line of data.

The widths of column electrodes 18 and channels 20 determine the dimensions of display elements 16, which are of rectangular shape. Column electrodes 18 are deposited on a major surface of a first electrically nonconductive, optically transparent substrate, and channels 20 are inscribed in a major surface of a second electrically nonconductive, optically transparent substrate, as will be further described below. Skilled persons will appreciate that certain systems, such as a reflective display of either the direct view or projection type, would require that only one of the substrates be optically transparent.

Column electrodes 18 receive data drive signals of the analog voltage type developed on parallel output conductors 22' by different ones of the output amplifiers 22 (FIGS. 2–6) of a data driver or drive circuit 24, and channels 20 receive data strobe signals of the voltage pulse type developed on parallel output conductors 26' by different ones of the output amplifiers 26 (FIGS. 2–6) of a data strobe or strobe means or strobe circuit 28. Each of the channels 20 includes a reference electrode 30 (FIG. 2) to which a reference potential common to each channel 20 and data strobe 28 is applied.

To synthesize an image on the entire area of display surface 14, display system 10 employs a scan control circuit 32 that coordinates the functions of data driver 24 and data strobe 28 so that all columns of display elements 16 of display panel 12 are addressed row by row in row scan fashion. Display panel 12 may employ electro-optic materials of different types. For example, if it uses such a material that changes the polarization state of incident light rays 33, display panel 12 is positioned between a pair of light polarizing filters 34 and 36 (FIG. 2), which cooperate with display panel 12 to change the luminance of light propagating through them. The use of a scattering liquid crystal cell as the electro-optic material would not require the use of polarizing filters 34 and 36, however. A color filter (not shown) may be positioned within display panel 12 to develop multi-colored images of controllable color intensity. For a projection display, color can also be achieved by using three separate monochrome panels 10, each of which controls one primary color.

With reference to FIGS. 2–5, display panel 12 comprises an addressing structure that includes a pair of generally parallel electrode structures 40 and 42 spaced apart by a layer 44 of electro-optic material, such as a nematic liquid crystal, and a thin layer 46 of a dielectric material, such as glass, mica, or plastic. The method and structure for providing uniform spacing between thin layer 46 and electrode structure 42 will be discussed below, following a general description of the addressing structure as a whole. Electrode structure 40 comprises a glass dielectric substrate 48 that has deposited on its inner surface 50 column electrodes 18 of indium tin oxide, which is optically transparent, to form a striped pattern. Adjacent pairs of column electrodes 18 are spaced apart a distance 52, typically approximately 0.0015 in (0.038 mm), which defines the horizontal space between next adjacent display elements 16 in a row. The horizontal space between column electrodes 18 define first inactive regions 53 in the electro-optical material, i.e., regions in which the optical properties of the electro-optical material are not controlled.

Figure 2:
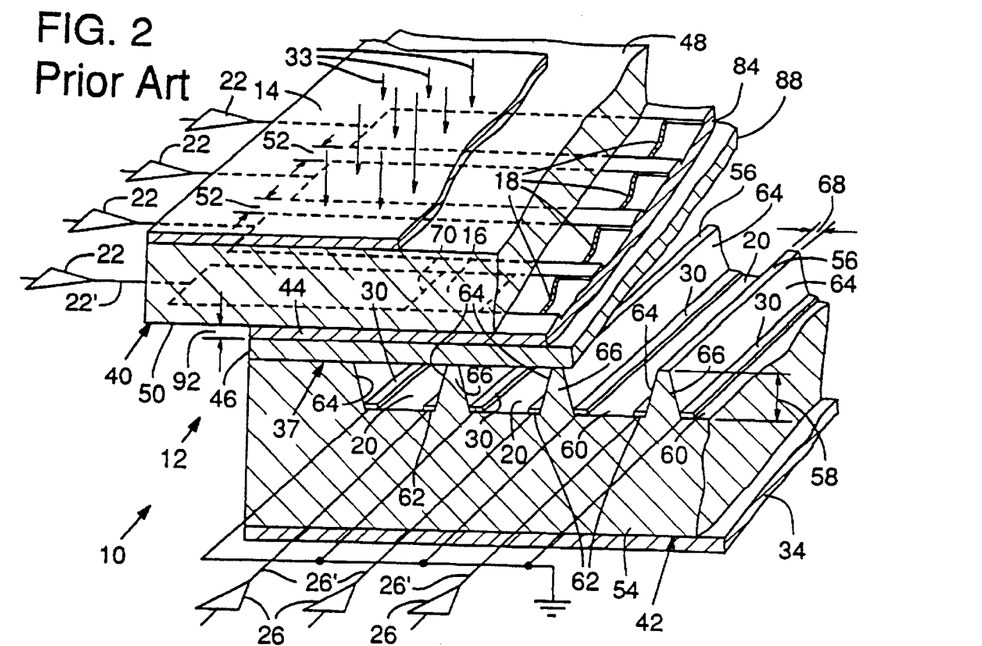
FIG. 2 is an enlarged fragmentary isometric view showing the layers of structural components forming the display panels described in the '149 Patent as viewed from the left side in FIG. 1.
Figure 3:
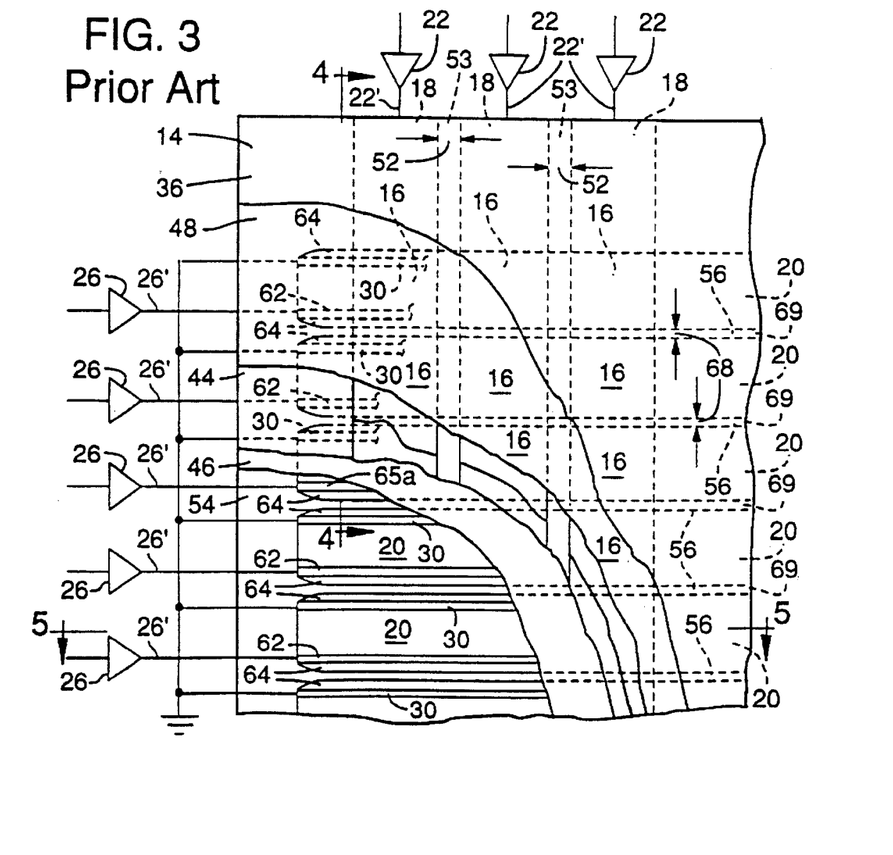
FIG. 3 is an enlarged fragmentary frontal view with portions broken away to show different depthwise views of the interior of the display panel of FIG. 2.
Figures 4, 5:
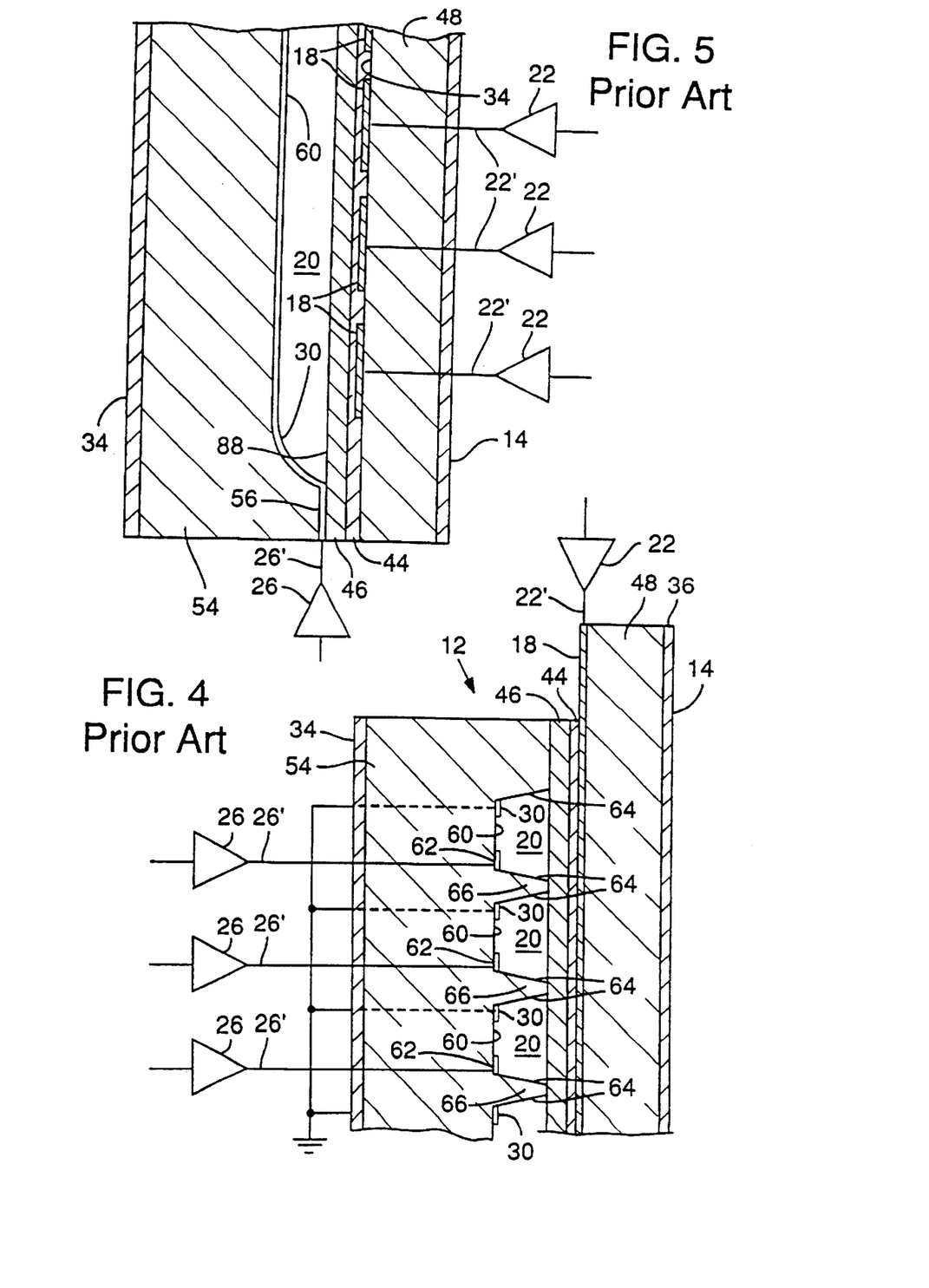
FIG. 4 is an enlarged sectional view taken along lines 4—4 of FIG. 3.
FIG. 5 is an enlarged sectional view taken along lines 5—5 of FIG. 3.

Electrode structure 42 comprises a glass dielectric substrate 54 into whose inner surface 56 multiple channels 20 of preferably trapezoidal cross section are inscribed. Channels 20 have a depth 58 measured from inner surface 56 to a base portion 60. Each one of the channels 20 has a pair of thin, narrow nickel electrodes 30 and 62 extending along base portion 60 and a pair of inner side walls 64 diverging in the direction away from base portion 60 toward inner surface 56. The reference electrodes 30 of the channels 20 are connected to a common electrical reference potential, which can be fixed at ground potential as shown. The electrodes 62 of the channels 20 are connected to different ones of the output amplifiers 26 (of which three and five are shown in FIGS. 2 and 3, respectively) of data strobe 28. (The electrodes 62 are hereinafter referred to as "row electrodes 62.") To ensure proper operation of the addressing structure, the reference electrodes 30 and row electrodes 62 preferably are connected to the electrical reference potentials and the outputs 26' of data strobe 28, respectively, on opposite sides of display panel 10.

The sidewalls 64 between adjacent channels 20 define a plurality of support structures 66 whose top surfaces 56 support layer 46 of dielectric material. Adjacent ones of channels 20 are spaced apart by a width 68 of the top portion of each support structure 66, which width 68 defines the vertical space between next adjacent display elements 16 in a column. The top surfaces 56 of each support structure 66 also define plural second inactive regions 69 in the electro-optical material, i.e., regions in which the optical properties of the electro-optical material are not controlled. Plural overlapping regions 70 of column electrodes 18 and channels 20 define dimensions of display elements 16, which are shown in dashed lines in FIGS. 2 and 3. FIG. 3 shows with better clarity the array of display elements 16 and the vertical and horizontal spacings between them.

Inactive regions 53 and 69 are typically masked using a "blackout" or "black surround" material, such as DARC 100 resin available from Brewer Science, to prevent these uncontrolled regions from distracting from a displayed image. The black surround is typically applied to a region slightly wider than inactive regions 53 and 69 because the electro-optical material is not well controlled at the edges of display elements 16. For example, in a preferred embodiment, the width 68 is approximately 0.0015 in (0.037 mm) wide, and the black surround is approximately 0.002 in (0.050 mm) wide.

Distance 52 is typically much less than the width of column electrodes 18. The inclinations of the side walls 64 between adjacent channels 20 specify the distance 68, which is typically much less than the width of channels 20. The widths of the column electrodes 18 and the channels 20 are functions of the desired image resolution, which is specified by the display application. It is desirable to make distances 52 and 68 as small as possible. In current models of display panel 12, the channel depth 58 is one-third the channel width.

Each of the channels 20 is filled with an ionizable gas, preferably one that includes helium, for reasons that will be explained below. Layer 46 of dielectric material functions as an isolating barrier between the ionizable gas contained within channel 20 and layer 44 of liquid crystal material. The absence of dielectric layer 46 would permit either the liquid crystal material to flow into the channel 20 or the ionizable gas to contaminate the liquid crystal material, however. Dielectric layer 46 may be eliminated from displays that employ a solid or encapsulated electro-optic material.

Figure 6:
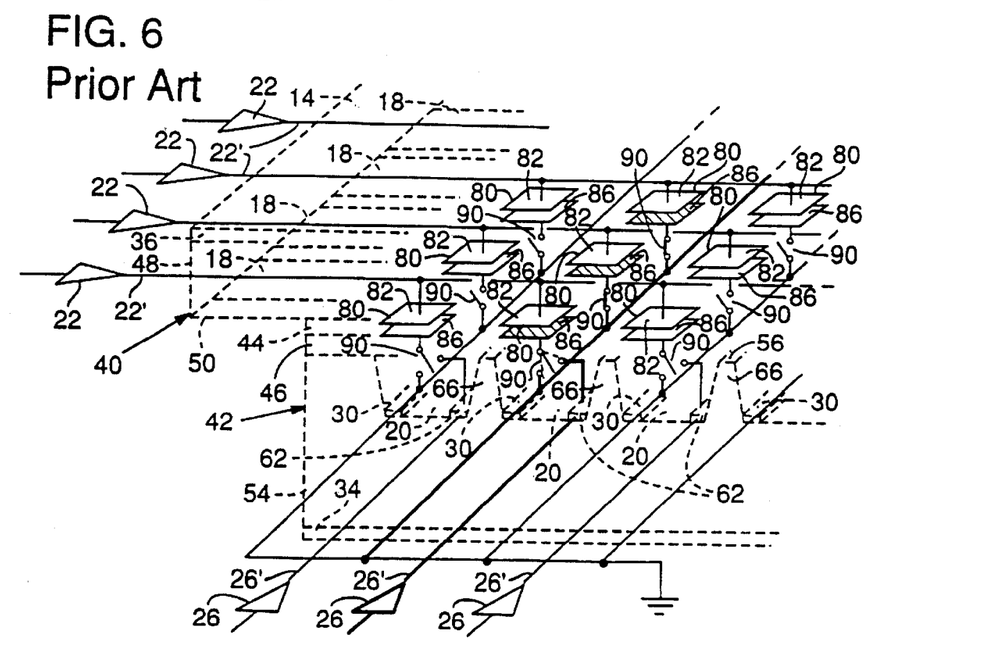
FIG. 6 is an equivalent circuit showing for a display system the operation of the plasma as a switch for an exemplary row receiving a data strobe pulse and three exemplary data columns receiving a data drive signal.
Figure 7:
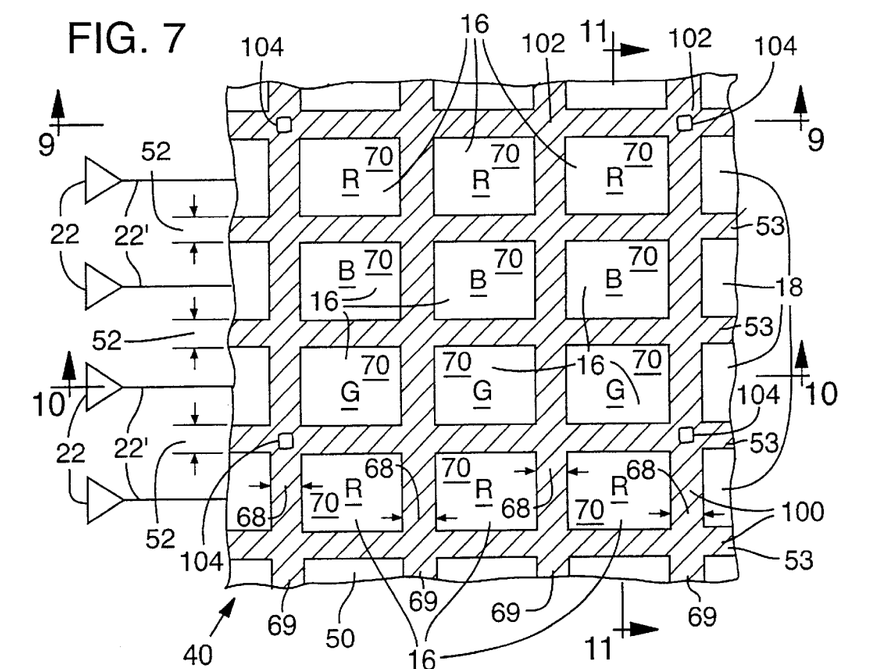
FIG. 7 is a fragmentary plan view of an electrode structure of the display panel of FIG. 2 showing spacers of a first preferred embodiment of the present invention.
Figure 8:
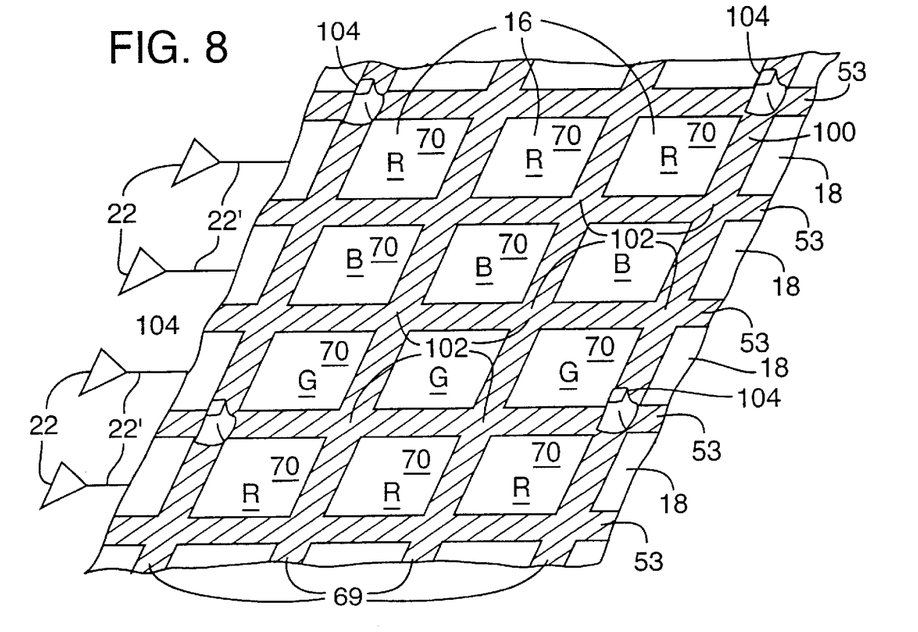
FIG. 8 is an isometric view of the electrode structure of FIG. 7.
Figure 9:
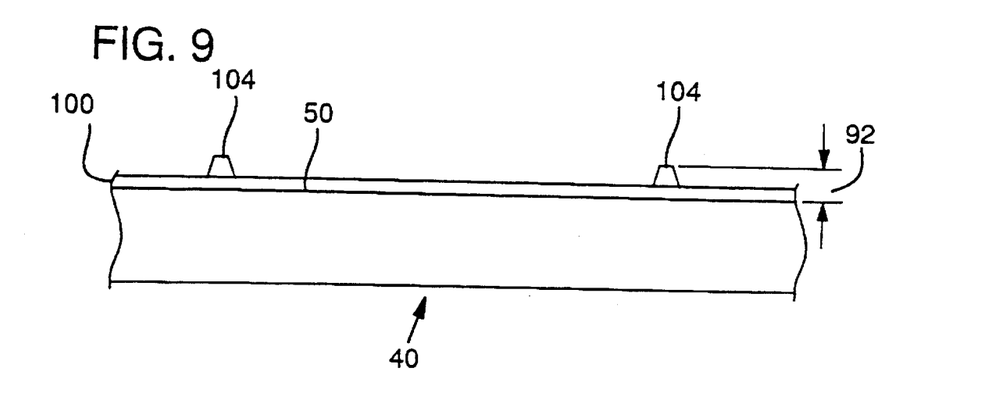
FIGS. 9, 10, and 11 are sectional views taken along lines 9—9, 10—10, and 11—11, respectively, of the electrode structure of FIG. 7.
Figure 10:
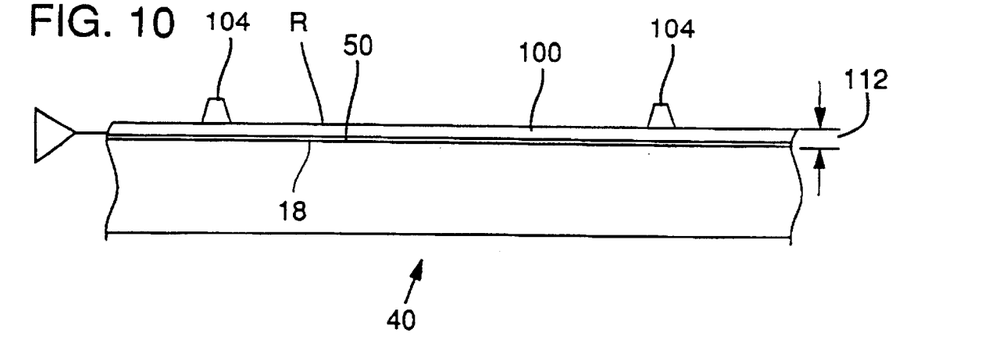
Figure 11:
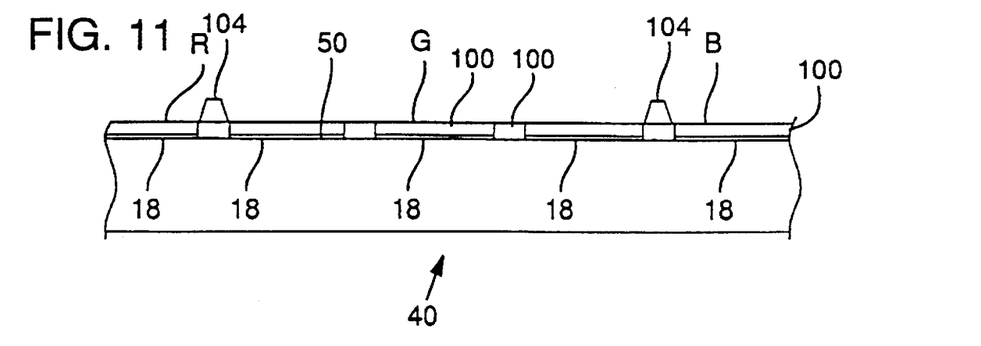

The principles underlying the operation of display panel 12 are that (1) each of its display elements 16 functions as a sampling capacitor for analog voltage data applied to the column electrodes 18 forming a part of the display element and (2) the ionizable gas functions as a sampling switch. FIG. 6 is an equivalent circuit to which the following explanation of the operation of display system 10 refers.

With reference to FIG. 6, each of display elements 16 of display panel 12 can be modeled as a capacitor 80 (hereinafter "capacitor model 80"), whose top plate 82 represents one of the column electrodes 18 (FIG. 2) and whose bottom plate 86 represents the free surface 88 (FIG. 2) of layer 46 of the dielectric material. Capacitor model 80 represents the capacitive liquid crystal cell formed by an overlapping region of a column electrode 18 and a channel 20. The description herein of the operation of display system 10 refers to the capacitor model 80.

In accordance with the basic addressing procedure, data driver 24 captures a first line of data, which represents discrete samples of the time-varying voltage of analog data signal in a time interval of predetermined duration. The sample of the magnitude of the data signal at a particular instance within the time interval represents the magnitude of the analog voltage applied to a capacitor model 80 in a corresponding column position of the row electrode 62 receiving a strobe pulse. Data driver 24 develops on its output conductors 22 the analog voltages that are applied to column electrodes 18. In FIG. 6, four exemplary output amplifiers 22 of data driver 24 deliver analog voltages of positive polarity with respect to reference electrode 30 to the respective ones of column electrodes 18 to which they are connected. The application of a positive voltage on a column electrode 18 induces on free surface 88 (FIG. 2) of layer 46 of the dielectric material a voltage that is essentially equal to the magnitude of the applied voltage. This causes no change in the potential difference across capacitor model 80 and is represented in FIG. 6 by a top plate 82 and a bottom plate 86 with white (non-shaded) surfaces.

In this instance, the gas contained in a channel 20 is in a nonionized state, and the analog voltage developed on plates 82 and 86 of capacitor model 80 is positive with respect to the voltage potential of reference electrode 30 in the channel. Whenever data strobe 28 develops a negative-going voltage pulse of sufficient magnitude on the row electrode 62 positioned within a channel 20, the gas in the channel assumes an ionized state (i.e., becomes a plasma). The channel 20 whose row electrode receives the strobe pulse is represented in FIG. 6 in dark, thick lines. Under these conditions, the grounded reference electrode 30 and the strobed row electrode 62 function as an anode and a cathode, respectively, for the plasma contained within the channel.

The electrons in the plasma neutralize the induced positive charge on the bottom plates 86 of capacitor models 80. The capacitor models 80 in the strobed row are charged with the data voltages applied across them. This condition is indicated in FIG. 6 by top plates 82 with white surfaces and bottom plates 86 with lined surfaces. Upon completion of the storage of the data voltages across capacitor models 80, data strobe 28 terminates the negative-going voltage pulse on the row electrode 62 of the strobed channel 20, thereby ending the strobe pulse and extinguishing the plasma.

Each of the row electrodes 62 is strobed in a similar manner until the entire display surface 14 is completely addressed and thereby stores an image field of data. The voltage remains stored across each of the capacitor models 80 in the strobed row for a time at least as long as the duration of the image field and is nearly independent of subsequent changes in data voltage applied to top plate 82 capacitor model 80. The voltage stored across each of the capacitor models 80 changes in accordance with the analog data voltages representing the display data of the next succeeding image field.

In a display system 10 whose image fields are in a noninterlaced format, the analog data voltages applied to column electrodes 18 in the next succeeding image field are of opposite polarity. Alternating between positive and negative polarities from one image field to the next image field provides a long-term zero net DC voltage component, which is typically required for long-term operation of liquid crystal materials. The liquid crystal material produces the gray scale effect in response to the root-mean-square (rms) value of the applied analog voltage data. The display image produced is, therefore, unaffected by alternate changes in polarity of the analog voltage data.

In a display system 10 whose image fields are in an interlaced format, the analog data voltages applied to column electrodes 18 in next succeeding image frames are of opposite polarity to achieve the long-term zero net DC voltage component. Each image frame includes two image fields of which each comprises one-half the number of addressable lines.

The description presented above indicates that the ionizable gas contained within each of the channels 20 operates as an electrical switch 90 whose contact position changes between binary switching states as a function of the voltage applied by data strobe 28. The switches 90 shown in FIG. 6 in the open position are connected to reference electrodes 30 and are driven by a strobe pulse applied to row electrodes 62. The absence of a strobe pulse allows the gas within the channels 20 to be in a nonionized state and thereby be in a nonconducting state. The switches 90 shown in FIG. 6 in the closed position are connected to a reference electrode 30 and are driven by a strobe pulse that is applied to row electrode 64 and is of a magnitude that causes the gas within the channel 20 to be in an ionized state and thereby be in a conducting state. In FIG. 6, the amplifier 26 shown in the middle of the three output amplifiers 26 of data strobe 28 strobes a row of capacitor models 80 to establish and store the display data voltages across them.

To function as a switch, the ionizable gas contained within channels 20 beneath electrode structure 40 communicates with layer 46 of the dielectric material to provide an electrically conductive path from layer 46 of the dielectric material to reference electrode 30. The plasma in a channel 20 whose row electrode 62 receives a strobe pulse provides a ground path to the capacitor model 80 representing the portion of liquid crystal material positioned adjacent the plasma. This allows the capacitor models 80 to sample the analog data voltages applied to column electrodes 18. Extinguishing the plasma acts to remove the conducting path, thereby allowing the data sample to be held across the display element. The voltages remain stored across layer 44 of the liquid crystal material until voltages representing a new line of data in a subsequent image field are developed across the layer 44. The above-described addressing structure and technique provide signals of essentially 100 percent duty cycle to every one of the display elements 16.

Electrode structure 42 has limitations imposed by manufacturing and operational considerations. Its row electrodes 30 and reference electrodes 62 must not have defects which interfere with their electrical conductivity. For electrode structure 42, the number of display elements per unit area determines the resolution (in the case of a plasma addressed liquid crystal display system or a video camera), and the number of memory sites per unit area determines the memory density (in the case of a storage system). A greater resolution or memory density, which is desirable for many applications, calls for channels 20 to be narrower and spaced closer together. A narrower channel 20 has a narrower base portion 60. The width of base portion 60 limits the width of row electrodes 30 and of reference electrodes 62. When electrodes 30 and/or 62 are thinner, manufacturing defects are more likely to interfere with adequate electrical conductivity.

Skilled persons will appreciate that the optimum operating parameters of devices which employ electrode structures according to the '149 Patent will vary depending on the materials of the electrodes and the geometry of the channels. Such operating parameters include the ionizable gas used to fill the channels, the pressure at which that gas is maintained, and the voltages and currents used to initiate and to maintain ionization in the channels. Skilled persons can readily determine optimum operating parameters.

A typical example of an electrode structure, according to the '149 Patent, has as its ionizable gaseous medium helium at a pressure of 150 mbar. The channels are approximately 34.3 cm long and have a pitch (the spacing between corresponding points on a channel) of approximately 0.5 mm. The width of each channel is approximately 0.43 mm at base portion 60 and expands approximately 0.15 mm between base portion 60 and top surface 56. The electrodes are formed of aluminum and are approximately 2 microns thick. The maximum potential between electrodes is approximately 400 volts, and the maximum current between electrodes is approximately 150 milliamperes.

The optical properties and switching speed of liquid crystal materials depend upon the thickness of the liquid crystal layer. The spacing between dielectric layer 46 and electrode structure 40 is, therefore, maintained at a predetermined distance 92 to within a predetermined tolerance. In a preferred embodiment, the nominal spacing is 5.8 μm with a tolerance of +/−0.1 μm.

FIGS. 7–12 show a first preferred embodiment of a system of the present invention for maintaining a uniform liquid crystal layer by uniformly spacing apart electrode structure 40 and dielectric layer 46. A black surround material 100 covers inactive areas 53 and 69 to prevent interference with an image due to the uncontrolled optical state of liquid crystal layer 44 in those areas. The intersection between inactive areas 53 and 69 defines intersection locations 102 within inactive areas 53 and 69. Spacers 104 are formed at intersection location 102, which are directly opposite top surfaces 56 of electrode structure 42. Therefore, pressure from electrode structure 40 is transmitted through dielectric layer 46 at points where it is supported by support structures 66, thereby eliminating deformation of dielectric 46.

An important aspect of the invention is that the force from electrode structure 40 is transmitted directly through dielectric 46 onto support structure 66. To transmit the force directly onto support structure 66 using prior art randomly located particulate spacers would require an increase in spacer density corresponding to the ratio of unsupported to supported areas of dielectric layer 46. Such a large increase in particulate spacer density would interfere significantly with a displayed image. By forming them directly onto support structures 66 in inactive display areas, spacers 104 provide support for electrode structure 40 without degrading the image. Spacers 104 of this invention can be formed anywhere in inactive areas 69 and need not be confined to intersection locations 102 to transfer forces directly on support structure 66.

Spacers 104 are preferably not formed at every intersection location 102. For example, a preferred spacer pattern has spacers 104 formed at every third intersection location 102 of every third inactive area 53. This pattern, which provides a spacer at approximately every ninth intersection location 102, provides sufficient support for electrode structure 40 and reduces the total spacer area. A reduced total spacer area is desirable to minimize breakage. Breakage can occur when particulate contamination lodges on top surface 56 of support structure 66 and holds dielectric layer 46 off of the top surface 56, forming a local tent-like structure. A spacer pressing at one of the tent-like structures can cause defects or breakage of dielectric layer 46. Minimizing the total surface area of all spacers reduces the probability of such contamination-induced defects.

Preferred spacers 104 are formed on electrode substrate 40 by a photoetching process after electrodes 18, black surround layer 100, and optional color filter layers (labeled by letters "R" for red, "G" for green, and "B" for blue) have been formed using conventional techniques. Spacers 104 are formed by applying a resin, such as P-16 polyimide resin from Brewer Science Inc., to electrode substrate 40 using a conventional spin-on technique. The spin speed and duration depend on the desired layer thickness, which corresponds to the desired thickness 92 of liquid crystal layer 44. A spin speed of between 700 and 1,100 rpm for 260 seconds is typical. The spun-on polyimide film is baked to partly cure the resin. A typical baking step entails heating the resin at 135° C. for 30 minutes. Substrate 40 is then coated with photoresist. For example, Shipley 1470 photoresist is spun on for 60 seconds at 1,200 rpm and then cured by baking on a hot plate for 90 seconds.

The photoresist is then exposed through a mask containing the desired spacer pattern. The shape of individual spacers 104 is not critical. A typical spacer, formed from an unexposed photoresist square with 0.002 in (0.050 mm) sides, has a resulting top surface in the shape of a rounded square with 0.00025 in (0.006 mm) sides. Spacers 104 are, of course, broader at the base as a result of the etching process. A typical exposure step would include exposure to approximately 250 mJ/cm$^2$. Following exposure, the photoresist is developed. A typical development step uses a mixture of 50 percent deionized water and 50 percent Microposit MF-312 Developer Concentrate by volume in a spin spray developer apparatus. The developer apparatus alternates between six-second sprays of developer and 20-second sprays of deionized water, until the unexposed photoresist is completely removed. The developer dissolves the exposed photoresist, uncovering portions of the polyimide resin that are then also dissolved.

Figure 12:
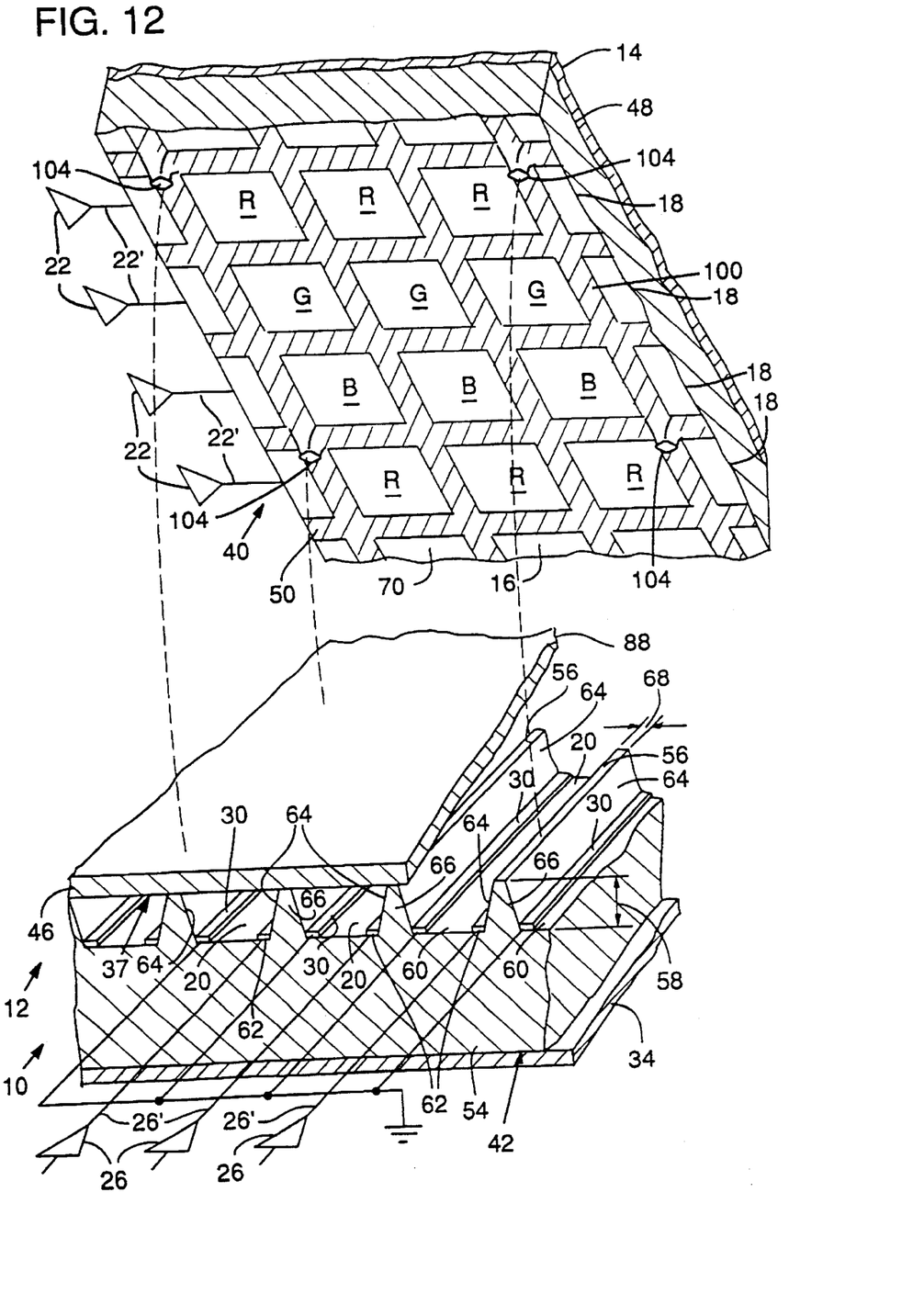
FIG. 12 is an isometric view of the first and second electrode structures of FIG. 2, showing the alignment of the spacers of the first preferred embodiment with the support structures of the first addressing structure during assembly.
Figure 13:
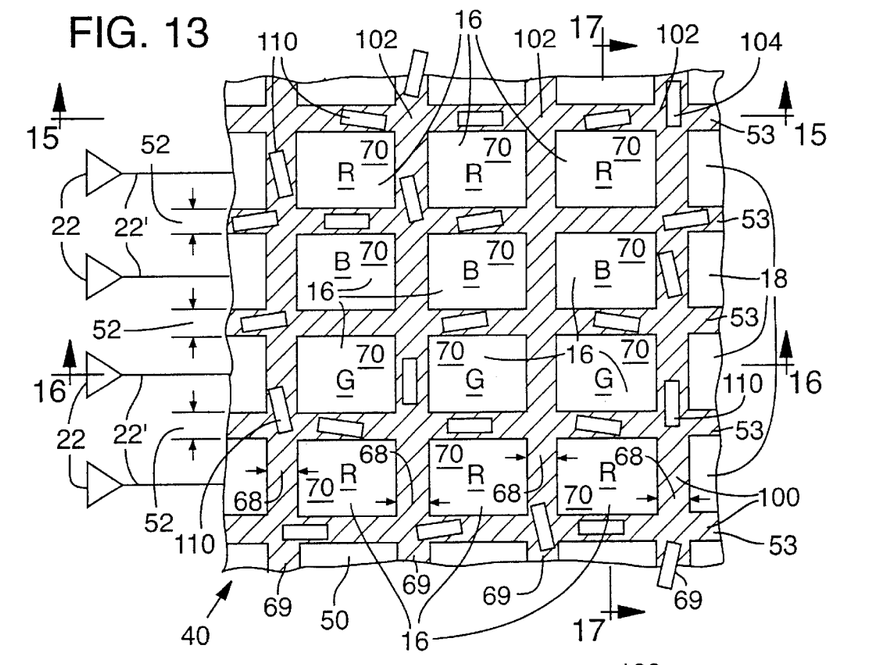
FIG. 13 is a fragmentary plan view of an electrode structure of the display panel of FIG. 2 showing spacers of a second embodiment of the present invention.
Figure 14:
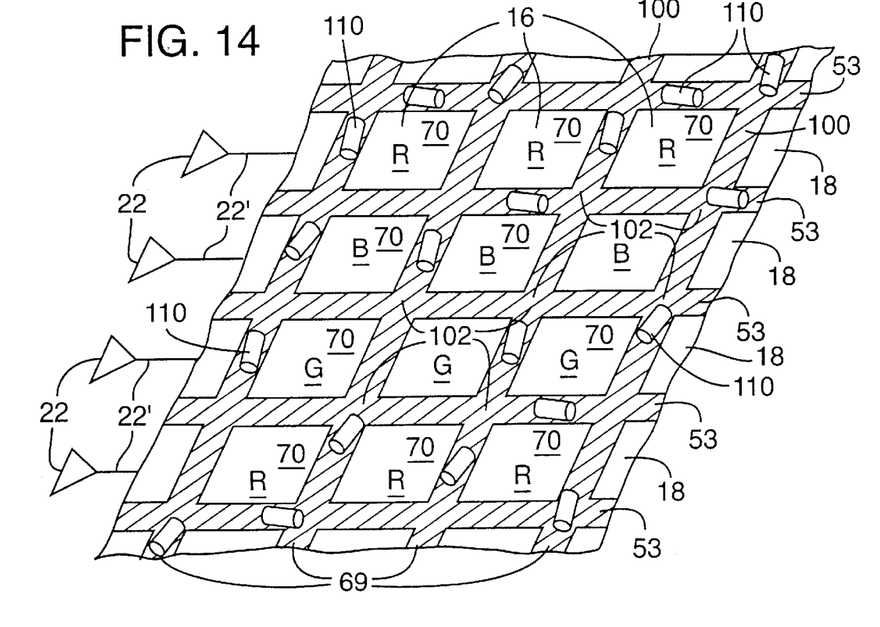
FIG. 14 is an isometric view of the electrode structure of FIG. 13.
Figure 15:
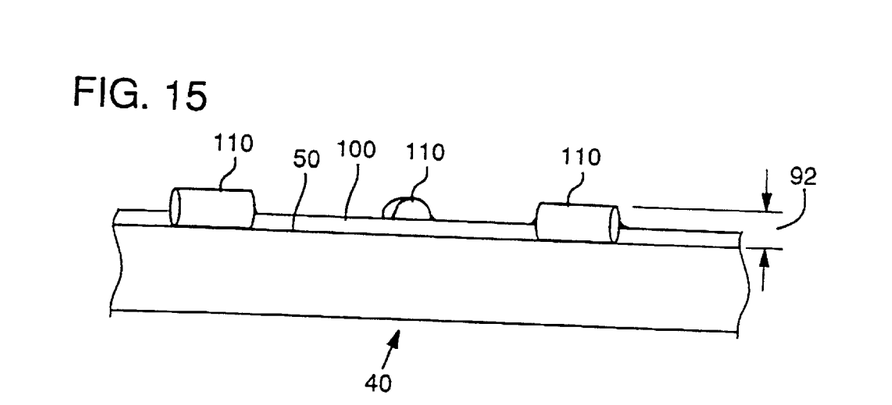
FIGS. 15, 16, and 17 are sectional views taken along lines 15—15, 16—16, and 17—17, respectively, of the electrode structure of FIG. 13.
Figure 16:
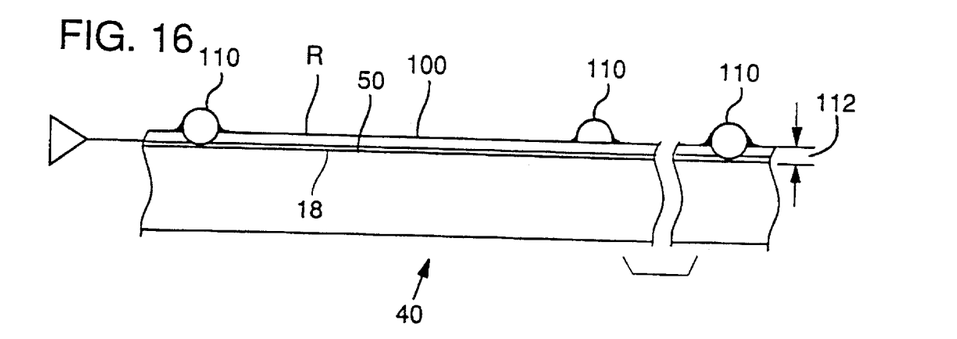
Figure 17:
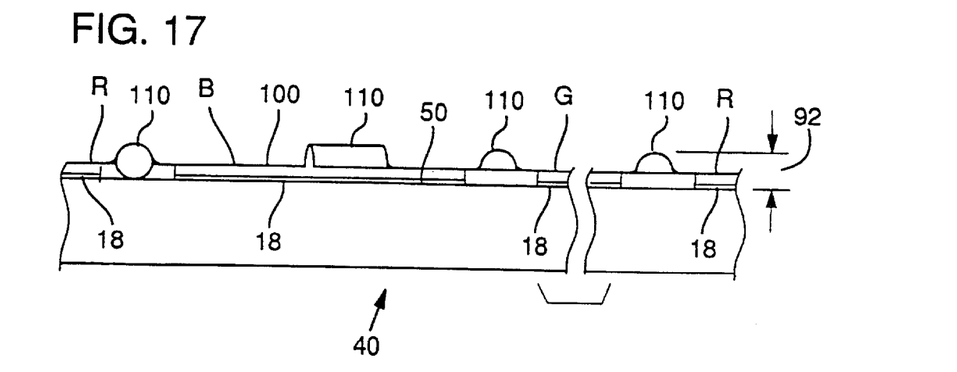

The exposed photoresist is then removed using a photoresist stripper, such as Brewer Safestrip. The formed spacers are cured at 250° C. for one hour, and then an alignment coating (not shown) for orienting the liquid crystal molecules of layer 44 is applied to inner surface 50 of electrode structure 40. Display 10 is assembled using a microscope to align electrode structures 40 and 42 so that spacers 102 align with top surfaces 56 of electrode structure 42 as shown in FIG. 12.

A second embodiment is shown in FIGS. 13–18. In this embodiment, multiple particulate spacers 110 are used, but rather than being randomly located as in the prior art, spacers 110 are positioned only in inactive areas 53 and 69. This positioning is achieved by mixing particulate spacers at an appropriate concentration with the black surround material before it is applied. The black surround material is then applied, preferably by spraying, onto electrode substrate 40 as layer 100 having a thickness 112 of preferably approximately 2–3 mm. The black surround material adheres to both spacers 110 and substrate 40, essentially trapping spacers 110 in black surround layer 100. When the black surround material is photopatterned using conventional techniques, the black surround material and the trapped particulate spacers are removed from active areas of the display. In inactive areas 53 and 69, the particulate spacers remain in the black surround. The concentration of spacers 110 is preferably the minimum necessary to supply sufficient support for electrode substrate 40. Additional spacers 110 increase the possibility of breakage or defects caused by particulate contamination, as explained above.

Figure 18:
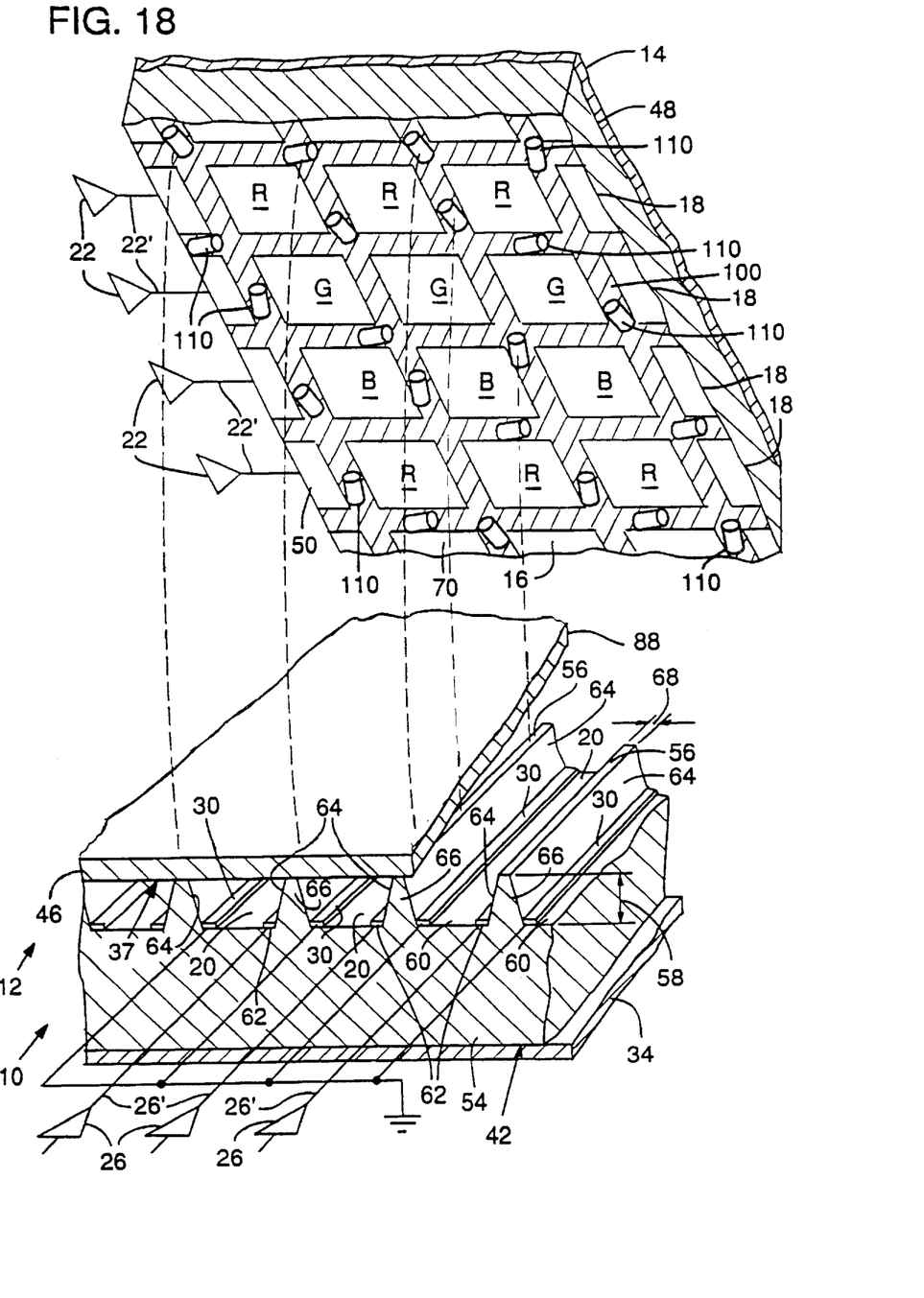
FIG. 18 is an isometric view of the first and second electrode structures of FIG. 2, showing the alignment of the spacers of the second embodiment with the support structures of the first addressing structure during assembly.
Figure 19:
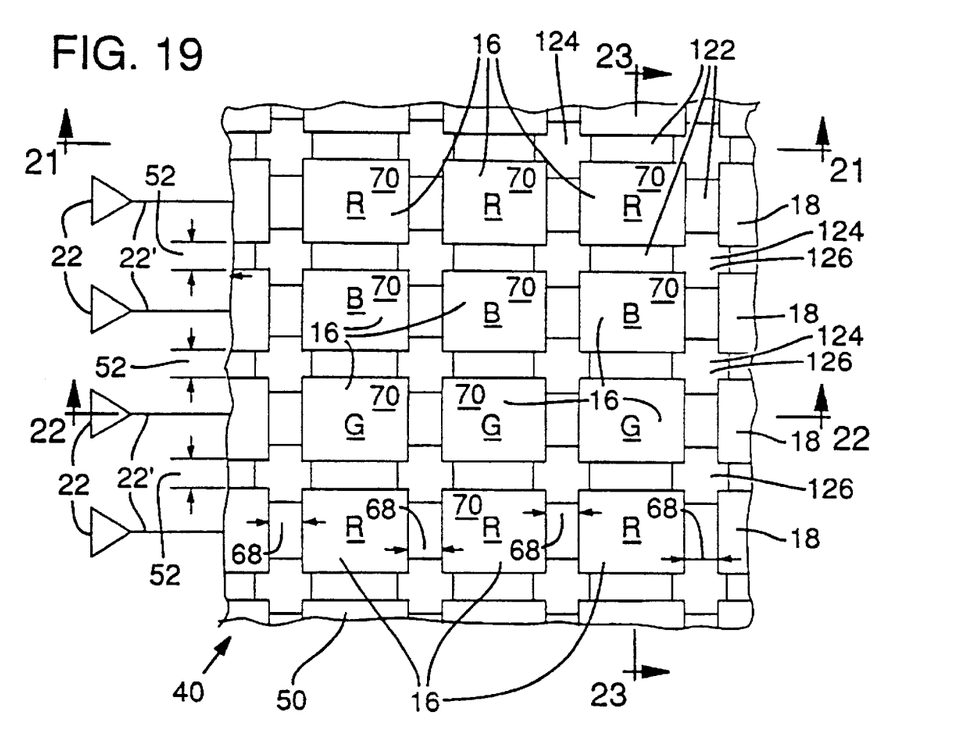
FIG. 19 is a fragmentary plan view of an electrode structure of the display panel of FIG. 2 showing spacers of a third embodiment of the present invention.
Figure 20:
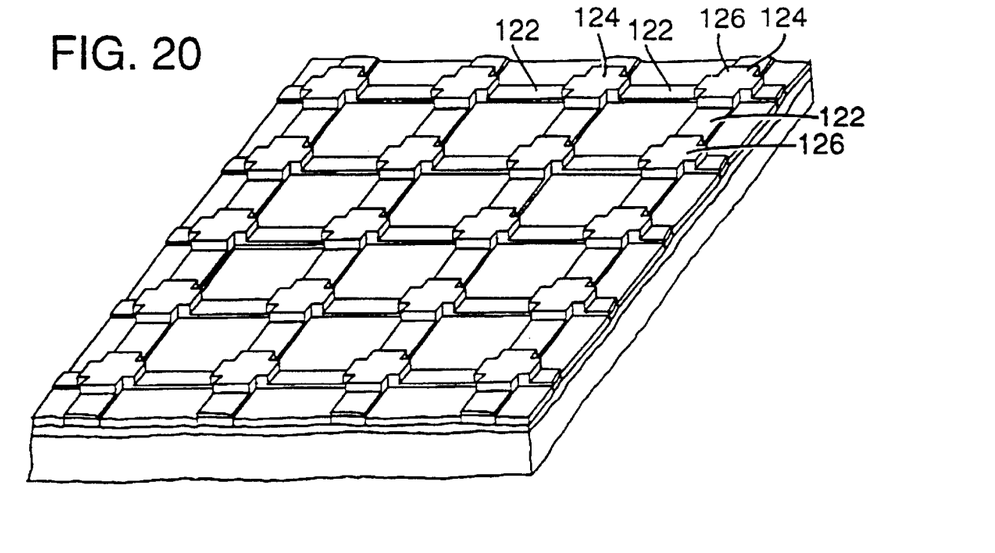
FIG. 20 is an isometric view of the electrode structure of FIG. 19.
Figure 21:
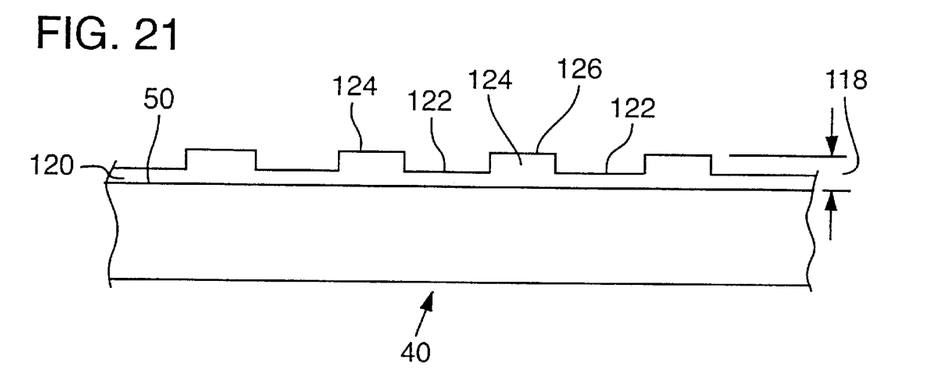
FIGS. 21, 22, and 23 are sectional views taken along lines 21—21, 22—22, and 23—23, respectively, of the electrode structure of FIG. 19.
Figure 22:
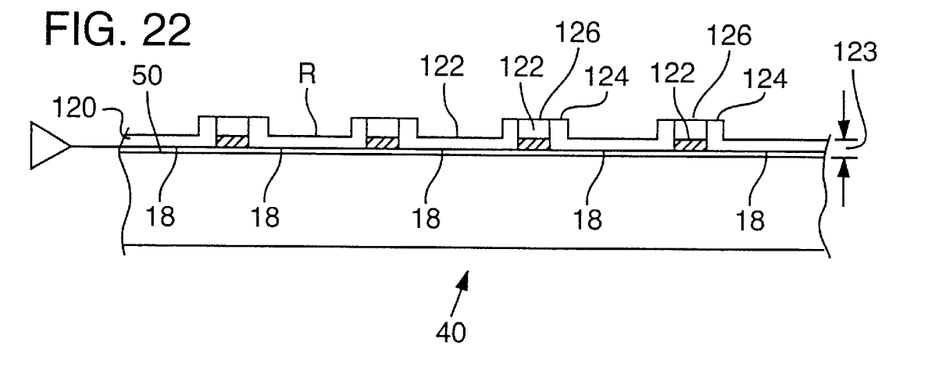
Figure 23:
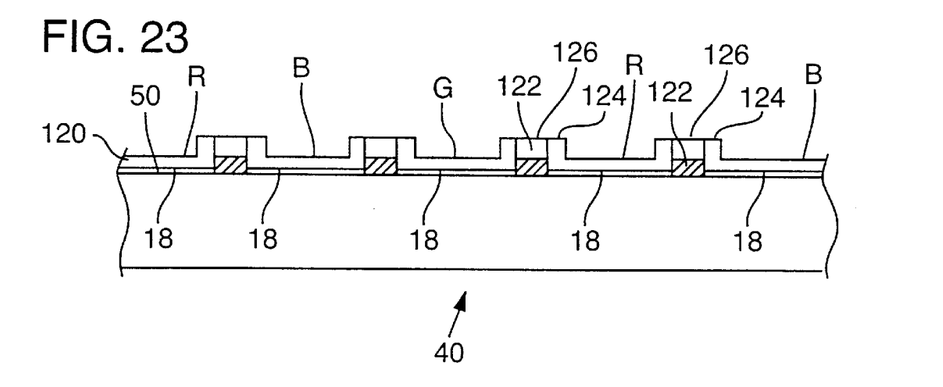

Display 10 is assembled, using a microscope to align electrode structures 40 and 42 so that spacers 102 align with top surfaces 56 of electrode structure 42 as shown in FIG. 18. Black surround layer 100 can be applied in two separate steps to inactive areas 53 and 69. In a two-step process, particulate spacers 110 are entrained only in the black surround material that is to be patterned over inactive areas 69 over the top surfaces 56 of support structures 66. By eliminating particulate spacers in inactive areas 53, the possibility of contamination-induced defects is reduced without significantly reducing the support for electrode structure 40. However, this second embodiment, with spacers randomly positioned in the inactive areas, still requires a higher density of spacers than the photoetched polyimide embodiment to ensure sufficient support for electrode structure 40 in all areas of the display. For clarity, particulate spacers 110 are shown larger than scale in FIGS. 13–18. It will be obvious that other types of particulate spacers, such as beads, could also be used.

Figure 24:
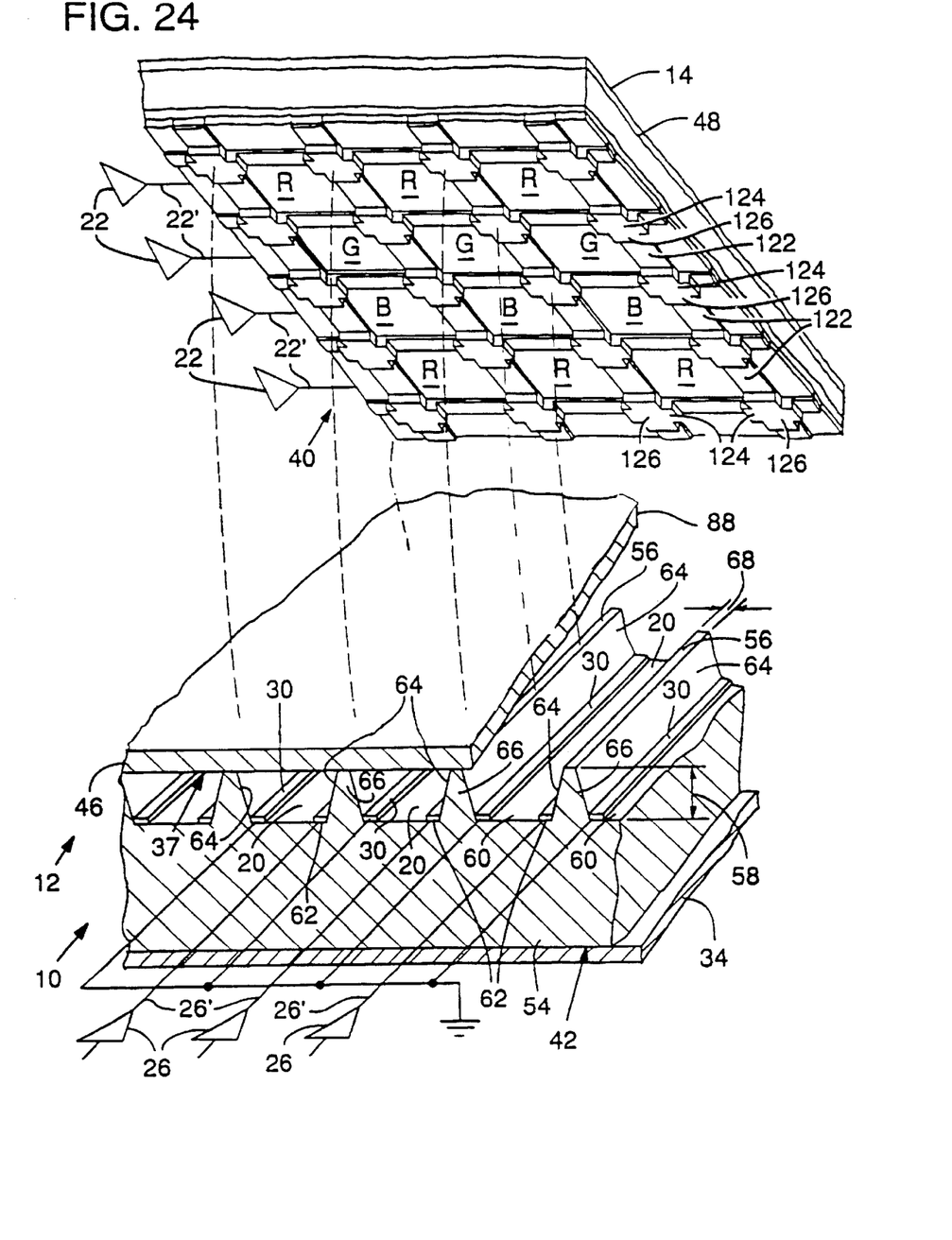
FIG. 24 is an isometric view of the first and second electrode structures of FIG. 2, showing the alignment of the spacers of the third embodiment with the support structures of the addressing structure during assembly.

A third embodiment is shown in FIGS. 19–24. In this third embodiment, a black surround material 120 is applied at a thickness 118 equal to thickness 92 of liquid crystal layer 44. Black surround material 120 is then photoetched using a two-step process. In the first step, black surround material 120 is etched to remove it from the active display areas. In the second step, the thickness of material 120 is reduced at multiple areas 122 to a thickness 123 of approximately 2–3 mm, leaving plural areas 124 at the correct thickness to act as spacers 126. Although spacers 126 are shown as crosses at all intersection locations 102, spacers 126 can obviously be any shape and at any desired spatial frequency along inactive areas 53 and 69. Display 10 is assembled using a microscope to align electrode structures 40 and 42 so that spacers 102 align with top surfaces 56 of electrode structure 42 as shown in FIG. 24.

It will be apparent to skilled persons that many changes may be made to the details of the specific embodiments of the invention described herein without departing from the underlying principles thereof. The scope of the invention should, therefore, be determined only by the following claims.

What is claimed is:

1. An addressing structure for an electro-optical addressing system, comprising:

a first electrode structure including a plurality of support structures extending from a base and defining nonintersecting, spaced-apart channels generally aligned and in a first direction, the support structures having top surfaces the channels containing plural first electrodes and adapted to contain an ionizable gaseous medium;

a layer of dielectric material supported on the top surfaces of the support structures;

a second electrode structure including plural nonoverlapping second electrodes aligned in a second direction on a major surface facing the layer of dielectric material, the areas of overlap between the channels and the second electrodes defining active regions of the addressing structure;

a layer of liquid crystal material positioned between the layer of dielectric material and the second electrode structure, the liquid crystal material forming at the active regions an array of picture elements that respond optically to electronic signals conducted by the first and second electrodes; and multiple particulate spacers positioned within the layer of liquid crystal material and distributed between the dielectric layer and the second electrode structure, the spacers being positioned within the array of picture elements, staying position within the array elements, confined to regions outside of the active regions, and maintaining the second electrode structure at a predetermined distance from the layer of dielectric material, the predetermined distance enabling the switching of the liquid crystal material between optical states in response to electrical signals conducted by the first and second electrodes.

2. The electrode structure of claim 1 in which the particulate spacers comprise particulates chosen from the group consisting essentially of glass fibers, glass beads, plastic fibers, and plastic beads.

3. The electrode structure of claim 1 in which the particulate spacers are embedded in a blackout material.

4. The electrode structure of claim 1 in which the particulate spacers are embedded in a coating material.

5. The method of claim 1 in which the spacers are confined to less than all of the inactive areas.

6. An addressing structure for an electro-optical addressing system, comprising:

a first electrode structure including multiple support structures extending from a base and defining nonintersecting, spaced-apart channels generally aligned in a first direction, the support structures having top surfaces and the channels containing plural first electrodes and adapted to contain an ionizable gaseous medium;

a layer of dielectric material supported on the to surfaces of the support structure;

a second electrode structure including plural nonoverlapping second electrodes aligned in a second direction on a major surface facing the layer of dielectric material, the areas of overlap between the channels and the second electrodes defining active regions of the addressing structure;

multiple spacers of a blackout material distributed between the dielectric layer and the second electrode structure, the spacers staying position within the array elements, confined to regions outside of the active region and maintaining the second electrode structure at a predetermined distance from the layer of dielectric material, a layer of electro-optical material positioned between the layer of dielectric material and the second electrode structure, the electro-optical material forming an array of elements that respond optically to electronic signals conveyed by the first and second electrodes, and the multiple spacers being positioned within the array.

7. The structure of claim 6 in which intersections between areas opposite to the top surface of the support structures and areas between the second electrodes define intersection locations and in which the spacers are positioned at intersection locations.

8. The structure of claim 7 in which the spacer extends from the intersection locations.

9. The structure of claim 7 in which the spacers are substantially confined to regions opposite the top surfaces of the support structures.

10. The electrode structure of claim 6 in which the blackout material includes embedded particulate spacers.

* * * * *